United States Patent [19]
Suzuki

[11] 3,912,785
[45] Oct. 14, 1975

[54] OXO-RELATED REACTION MAKING TRIETHANOLMETHANE AND 3-METHYLPENTANEDIOL-1,5 FROM HEXENEDIOLS

[75] Inventor: Shigeto Suzuki, San Francisco, Calif.

[73] Assignee: Chevron Research Company, San Francisco, Calif.

[22] Filed: Dec. 11, 1973

[21] Appl. No.: 423,831

[52] U.S. Cl...... 260/635 R; 260/75 UA; 260/410.6; 260/488 J; 260/632 HF; 260/635 A
[51] Int. Cl.$^2$.......................................... C07C 29/16
[58] Field of Search....... 260/635 R, 635 A, 632 HF

[56] References Cited
UNITED STATES PATENTS

| | | | |
|---|---|---|---|
| 3,102,899 | 9/1963 | Cannell.......................... | 260/632 HF |
| 3,205,259 | 9/1965 | Zorn et al....................... | 260/635 R |
| 3,239,570 | 3/1966 | Slaugh et al. .................... | 260/635 R |
| 3,859,369 | 1/1975 | Copelin........................... | 260/635 R |

OTHER PUBLICATIONS
Hatch, "Higher Oxo Alcohols," (1957), p. 9.

Primary Examiner—Joseph E. Evans
Attorney, Agent, or Firm—G. F. Magdeburger; John Stoner, Jr.; T. G. De Jonghe

[57] ABSTRACT

A process for producing triethanolmethane and 3-methyl-1,5-pentanediol which comprises contacting a mixture of 3-methylene-1,5-pentanediol and 3-methyl-2-pentene-1,5-diol with a rhodium catalyst in homogeneous liquid phase with the mixture, and in the presence of carbon monoxide at a partial pressure between 25 and 5000 psig and hydrogen at a partial pressure between 50 and 10,000 psig, and at a temperature between 75° and 250°C. Preferably the reaction is carried out in the presence of an organic tertiary amine.

7 Claims, No Drawings

OXO-RELATED REACTION MAKING TRIETHANOLMETHANE AND 3-METHYLPENTANEDIOL-1,5 FROM HEXENEDIOLS

BACKGROUND OF THE INVENTION

The present invention relates to the conversion of olefinic alcohols to new alcohols in an oxo-type reaction.

The oxo process is the commercial application of a chemical reaction called oxonation or, more properly, hydroformylation. In this reaction, hydrogen and carbon monoxide are added across an olefinic bond to produce aldehydes and alcohols containing one more carbon atom than the olefin.

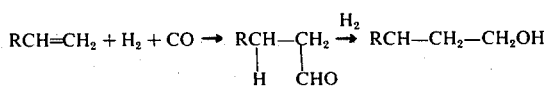

The oxo reaction is homogeneously catalyzed by Group VIII metals — iron, cobalt, nickel, ruthenium, rhodium, palladium, osmium, iridium and platinum — which metals are converted to metal carbonyls under reaction conditions. Cobalt is the only metal whose carbonyl catalysts are currently used commercially.

Cobalt carbonyls can be formed by the reaction of cobalt oxide or a cobalt salt or soap with hydrogen and carbon monoxide (synthesis gas) at high pressures and temperatures. The following equation is generally illustrative of industrial cobalt carbonyl synthesis. The letter "A" denotes an organic acid anion.

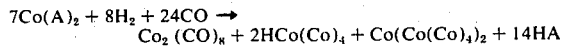

The metal carbonyl catalyst may be formed in situ in the hydroformylation reactor or synthesized externally in a separate vessel. Cobalt soaps such as the naphthenate or octanoate are usually preferred for in-situ carbonyl formation because they are soluble in the reaction mixture. The form of cobalt present in the hydroformylation reaction mixture is a function of the operating conditions. Not only are different forms produced in the carbonyl formation reaction itself, but also equilibria exist between various carbonyls and between the carbonyls and the metal.

Numerous patents have disclosed the use of a rhodium catalyst for an oxo reaction; see, for example, U.S. Pat. Nos. 3,515,757, 3,527,809, 3,594,425, 3,631,111, 3,636,159, 3,657,354 and 3,660,493.

The use of amines for oxo reactions is well known, and is disclosed in most of the above-cited patents.

Using unsaturated alcohols as the feedstock in an oxo reaction has also been disclosed. For example, Falbe in Brennstoff Chemie 47, 207 (1966) describes the oxo reaction with 4-hydroxymethylcyclohexene using either a cobalt or a rhodium catalyst to obtain a mixture of 1,3-di(hydroxymethyl)cyclohexane and 1,4-di(hydroxymethyl)cyclohexane. Copelin in Def. Publ. U.S. Patent office 904021 discloses the phosphine-modified, rhodiumcatalyzed hydroformylation of unsaturated alcohols to produce saturated diols.

According to Falbe in Chem. Ber. 98, 886 (1965), under the usual oxo reaction conditions, including use of a cobalt catalyst, unsaturated alcohols are usually isomerized to the corresponding aldehyde, which aldehyde may then be reduced.

Fell and Geurts in Chemie-Ingenieur-Technik 44, 708 (1972) disclose a rhodium-catalyzed hydroformylation of olefins to the saturated alcohols. The catalyst system used in Fell and Geurtz includes a tertiary amine such as N-butyl pyrolidine, tetramethylethylenediamine, triethylamine, etc. In conclusion, the authors state that this catalyst system should be especially advantageous for effecting hydroformylation of unsaturated compounds, which under the normal oxo reaction conditions undergo secondary reactions and produce little or no alcoholic product. "Such compounds are, for example, unsaturated alcohols, which are very easily isomerized to the corresponding carbonyl compounds . . .".

According to the Fell and Geurts reference, 1-octene, 2-octene, and a mixture of all octenes were hydroformylated under mild reaction conditions. It was found that the internal octenes were slower to react, but the product was the expected nonyl alcohols as derived from unisomerized olefins, in 97% yield.

SUMMARY OF THE INVENTION

According to the present invention, a process is provided for producing triethanolmethane (TEM) and 3-methyl-1,5-pentanediol (MPD) which comprises contacting a mixture of 3-methylene-1,5-pentanediol and 3-methyl-2-pentene-1,5-diol (hereinafter referred to as α-diol and β-diol, respectively) with a rhodium catalyst in homogeneous liquid phase with the mixture, and in the presence of carbon monoxide at a partial pressure between 25 and 5000 psig and hydrogen at a partial pressure between 50 and 10,000 psig, at a temperature between 75° and 250°C. Preferably the reaction is carried out in the presence of an organic tertiary amine.

The process of the present invention affords an extremely useful reaction, in that a mixture of two difficultly separable unsaturated hexenediols can be submitted to the reaction to produce an easily separable mixture of a saturated heptanetriol and a saturated hexanediol. Both products are useful: the triol as an alcohol for esterification with $C_5$-$C_{10}$ acids to produce triester plasticizers (see Robert Bacskai application Serial No. 414,584, filed Nov. 9, 1973, entitled "Esters"), and the diol for reaction with maleic or fumaric acids to produce linear unsaturated polyesters (see Ser. No. 323,752, Robert Bacskai et al, filed Jan. 15, 1973, entitled "Unsaturated Polyesters Having High Impact Strength and Low Water Absorption").

The concurrent reactions of the present invention can be indicated as follows:

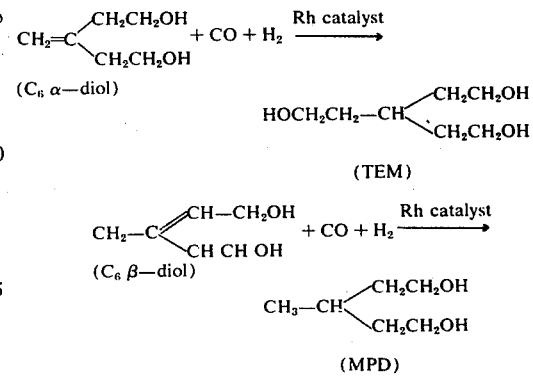

Preferably the reaction is carried out in the presence of an amine effective to increase the rate of hydroformylation of 3-methylene-1,5-pentanediol to triethanolmethane.

Among other factors, the present invention is based on my unexpected finding that under oxo reaction conditions, preferably mild oxo reaction conditions, when using a rhodium catalyst and preferably an organic tertiary amine, $C_6$ $\alpha$-diol and $C_6$ $\beta$-diol are respectively converted to a $C_7$ triol and a $C_6$ saturated diol. This is contrary to the results obtained under normal oxo reaction conditions, i.e., with a cobalt catalyst, wherein a mixture of over 35 compounds was obtained from the same diol mixture. At a 99% conversion of starting material, only 1.5% triethanolmethane and a trace of 3-methyl-1,5-pentanediol were found in the product. One would most likely expect both the $\alpha$- and $\beta$- diols to be saturated, or both to be converted to aldehydes; or that if the carbon monoxide did react with the unsaturated alcohols that then both alcohols would react and be increased by one in carbon number.

I have found that the preferred reaction conditions for the process of the present invention include a temperature between 100°–160°C., more preferably between 115°–145°C. The reaction pressure should be superatmospheric. In particular, the partial pressure of carbon monoxide should be between about 25–5000 psig, and the hydrogen partial pressure should be between about 50 and 10,000 psig. More preferably, the partial pressure of carbon monoxide is between 150 and 2000 psig, and the partial pressure of hydrogen is between 150 and 4000 psig. Preferably the mol ratio of carbon monoxide:hydrogen is from 1:1 to 1:4, more preferably from 1:1 to 1:2.

The catalyst used in the reaction of the present invention is a rhodium catalyst. Rhodium or a rhodium compound can be converted to the carbonyl complex under the reacton conditions of the present invention. A rhodium carbonyl complex catalyst can be prepared ex situ (i.e., in a vessel other than the vessel used for the process of the present invention) as well as in situ. Typically, a rhodium compound such as rhodium oxide, rhodium sulfate, rhodium trichloride or another rhodium salt is added to the reaction zone and is converted to a rhodium carbonyl complex under the reaction conditions, which include an elevated temperature and high partial pressures of carbon monoxide and hydrogen. Preferably the rhodium carbonyl catalyst used in the present invention is obtained by adding a rhodium oxide compound to the reaction zone. In general, the rhodium carbonyl catalyst can be formed as discussed with respect to cobalt carbonyl catalysts under "Background of the Invention," i.e., known methods can be used to obtain the rhodium catalyst.

The process of the present invention is preferably carried out in the presence of an organic amine, preferably a tertiary amine. Tertiary amines useful in this reaction are those amines having from 3 to 20 carbon atoms and a pKb value between 2 and 7, preferably between 2.5 and 5. For this purpose, pKb is defined as the negative logarithm of the ionization constant (Kb) of a base (ref. "Textbook of Quantitative Inorganic Analysis," I. M. Koltoff and E. B. Sandell, MacMillan Co., 1947, page 36). Although both aliphatic and aromatic tertiary amines are satisfactory, the aliphatic amines are better and are preferred. In this application, aromatic amines are those compounds having a single aromatic group attached directly to the nitrogen atom, the other two groups being aliphatic. Typical examples or aromatic amines include: N,N-dimethylaniline, N-methyl-N-ethylaniline, N,N-dimethyl-p-toluidine, N,N-dimethyl-$\alpha$-naphthylamine, etc. Tertiary aliphatic amines include the following: linear amines such as trimethylamine, triethylamine, tetramethylethylenediamine, pentamethyldiethylenetriamine, N,N-dimethylethanolamine, etc.; and the following cyclic amines: N-methylpyrolidine, N-methylpiperidine, quinnuclidene, N-methylmorpholine, N,N'-dimethylpiperazine, etc.

Particularly preferred organic amines for use in the present invention are trimethylamine, N,N,N',N'-tetramethylethylenediamine, penta-N-methylated diethylenetriamine, hexa-N-methylated triethylenetetramine, hepta-N-methylated tetraethylenepentamine, and N,N'-dimethylpiperazine.

Thus, in accordance with a preferred embodiment, the reaction of the present invention is carried out by charging the mixed hexenediols, rhodium catalyst and amine modifier to a reactor, such as a stirred autoclave. The reactor is closed and pressured up with a mixture of carbon monoxide and hydrogen. Then it is heated to the reaction temperature, usually in the range 90°–200°C., preferably 115°–145°C., and held at this temperature for a period of time sufficient to react at least 90%, preferably 95%, of the olefinic double bonds. This usually requires from about 1 to 16 hours, and may be determined by periodic double-bond analysis, e.g., vapor-phase chromatography, nuclear magnetic resonance, or infrared. After cooling to room temperature, the crude product mixture is charged to a distillation unit and separated into an MPD fraction, a TEM fraction and a bottoms fraction containing the rhodium catalyst. The amine modifier may be either in a forerun fraction or in the bottoms. Amine modifiers preferably are chosen so as to boil at temperatures well below that of MPD or well above that of TEM. An example of the first type is trimethylamine, and of the second type heptamethyl tetraethylenepentamine. In this way, the two product cuts are relatively uncontaminated by amine impurities. It is preferred that a high-boiling amine be used, so that the distillation bottoms will contain both catalyst and amine modifier for recycle. In this method of operation, some of the crude product can also be left in the bottoms fraction to provide more liquid volume.

The process of the present invention can also be carried out in a continuous manner using a reactor preferably having an average residence time within the above-given range, followed by a pressure letdown stage and a continuous distillation separation with recycle of rhodium catalyst and amine modifier.

The feedstock for the process of the present invention is readily prepared, for example, by the reaction of formaldehyde with 3-methyl-3-buten-1-ol. The product is about an equimolar mixture of 3-methylene-1,5-pentanediol and 3-methyl-2-pentene-1,5-diol. This is the preferred feedstock. Frequently the above mixture is also contaminated with unconverted 3-methyl-3-buten-1-ol. However, this impurity is usually not a problem, because under the reaction conditions it is converted to 3-methyl-1,5-pentanediol (MPD).

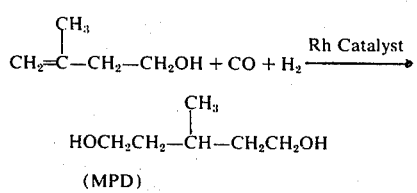

EXAMPLES

The following examples are illustrative of the process of the invention:

EXAMPLE 1

A mixture of 17.4 g (0.15 mol) containing 69% 3-methylene-1,5-pentanediol and 28% 3-methyl-2-pentene-1,5-diol was charged to a 300-ml autoclave together with 0.041 g (0.00014 mol) of rhodium oxide pentahydrate and 35.6 g (0.15 mol) of a 25% aqueous solution of trimethylamine. The reactor was closed and pressured to 900 psig with carbon monoxide and to 1800 psig with hydrogen. The reactor was then heated at 118°–121°C. for 3 hours and then at 139°C. for 5 hours. The reactor was cooled and the liquid contents (56.3 g) were analyzed by vapor-phase chromatography. This analysis showed the product to consist of 15.8 g triethanolmethane, 5.7 g of 3-methylpentanediol, and 3.8 g of organic by-products.

EXAMPLE 2

The procedure of Example 1 was followed except that the 17.4 g of diol mixture contained 94.4% 3-methylene-1,5-pentanediol and 4.7% 3-methyl-2-pentene-1,5-diol. The amine modifier was 6.1 g (0.0525 mol) of N,N,N',N'-tetramethylethylenediamine. Water (2.7 g) was also added. The reaction was run at 119°–123°C. for 2½ hours and then at 141°–143°C. for 2½ hours. The crude product was removed from the reactor with acetone. This solution, weighing 37.5 g, was evaporated on a rotovac to give 26.9 g of acetone-free crude product. Analysis, as before, showed it to contain 21.1 g of triethanolmethane and 3.8 g of 3-methyl-1,5-pentanediol.

EXAMPLE 3

This reaction was carried out as in Example 2 except that the 17.4 g of the diol feed contained 10.1% 3-methylene-1,5-pentanediol and 85.6% 3-methyl-2-pentene-1,5-diol. The product analyzed for 4.2 g of triethanolmethane and 13.5 g of 3-methyl-1,5-pentanediol.

EXAMPLE 4

A 1-liter stirred autoclave was charged with 220.0 g (1.9 mols) of a mixture containing 90.1% 3-methylene-1,5-pentanediol, 7.9% 3-methyl-2-pentene-1,5-diol and 2% 3-methyl-3-buten-1-ol; 77.3 g (0.665 mol) of N,N,N',N'-tetramethylethylenediamine; 34.2 g of water; 0.817 g of rhodium trichloride trihydrate; and 1.59 g of sodium carbonate. The reactor was pressured with 900 psi of carbon monoxide and 900 psi of hydrogen for a total of 1800 psi at 23°C. Then the reactor was heated at 119°–124°C. for 5½ hours. During this time, the reactor was repressured with a 1:1 molar mixture of carbon monoxide and hydrogen to maintain the reaction pressure between 1600–2500 psig at 121°C. Finally, the reactor was heated at 141°C. for 6½ hours. During this time, the reactor was repressurized once to 2500 psig with a 1:2.2 molar mixture of carbon monoxide and hydrogen. The total gas uptake was calculated to be 2120 psi at 23°C.

Analysis of the crude product by vapor-phase chromatography showed it to contain 262.8 g of triethanolmethane and 42.6 g of 3-methyl-1,5-pentanediol.

The reactor contents (369.3 g) were distilled and a portion redistilled to give a heart cut of triethanolmethane having a boiling point of 201°–205°C. at 1 mm of Hg. The NMR spectra were consistent with the assigned structure.

EXAMPLE 5

A 1-liter stirred autoclave was charged with 236.0 g (2.0 mol) of a mixture containing 51.5% 3-methylene-1,5-pentanediol, 44.0% 3-methyl-2-pentene-1,5-diol, and 4.5% 3-methyl-2-buten-1-ol; 77.6 g of N,N,N',N'-tetramethylethylenediamine; 36.0 g water; and 0.54 g rhodium oxide pentahydrate. The autoclave was then charged with 900 psi each of carbon monoxide and hydrogen. The temperature was held at 120–122°C. for 3½ hours and then at 142°–143°C. for 9 hours. During this time the pressure was maintained in the range 1500 to 2500 psig by the addition of carbon monoxide and hydrogen in a molar ratio in the range 1:1 to 1:1.7. Analysis of the product showed it to contain 194.8 g of triethanolmethane and 108.5 g of 3-methyl-1,5-pentanediol.

EXAMPLE 6

A 300-ml stirred autoclave was charged with 22.4 g (0.15 mol of a mixture containing 54.5% 3-methylene-1,5-pentanediol, 42.7% 3-methyl-2-pentene-1,5-diol and 2.8% 3-methyl-3-buten-1-ol; 0.85 g of cobalt octacarbonyl; and 14.0 g of water. The autoclave was then charged with 1000 psi of carbon monoxide and 1000 psi of hydrogen, for a total of 2000 psi, at 22°C. The reaction mixture was stirred at a temperature of 129°C. for 3 hours and then at 155°–165°C. for an additional 4 hours. After cooling to ambient temperature, the reaction mixture separated into two layers having a total weight of 39.21 g. The reaction mixture was diluted with methanol, shaken until homogenous, and then a sample was taken for analysis by vaporphase chromatography (VPC) using 2-ethylhexanol as an internal standard. The VPC analysis showed about 35 different compounds present, none over 3% of the total. Conversion of the starting material was over 99%. A trace amount of 3-methyl-1,5-pentanediol and 1.5% triethanolmethane were found.

What is claimed is:

1. A process for producing triethanolmethane and 3-methyl-1,5-pentanediol which comprises contacting a mixture of 3-methylene-1,5-pentanediol and 3-methyl-2-pentene-1,5-diol with a rhodium carbonyl complex catalyst in homogeneous liquid phase with the mixture, and in the presence of carbon monoxide at a partial pressure between 25 and 5000 psig and hydrogen at a partial pressure between 50 and 10,000 psig, and at a temperature between 75° and 250°C for a time sufficient to react at least 90% of the olefinic double bonds.

2. A process in accordance with claim 1 wherein the contacting is carried out in the presence of a tertiary amine having 3 to 20 carbon atoms and a pKb value between 2 and 7.

3. A process in accordance with claim 2 wherein the amine is a trialkylamine.

4. A process in accordance with claim 2 wherein the reaction is carried out at a temperature between about 100°–160°C.

5. A process in accordance with claim 2 wherein the reaction is carried out at a temperature between about 115°–145°C.

6. A process in accordance with claim 2 wherein the mol ratio of carbon monoxide:hydrogen is from 1:1 to 1:4.

7. A process in accordance with claim 2 wherein the rhodium catalyst is obtained by converting rhodium oxide to a rhodium carbonyl compound.

* * * * *

UNITED STATES PATENT AND TRADEMARK OFFICE
CERTIFICATE OF CORRECTION

PATENT NO. : 3,912,785
DATED : October 14, 1975
INVENTOR(S) : Shigeto Suzuki

It is certified that error appears in the above-identified patent and that said Letters Patent are hereby corrected as shown below:

Column 1, line 36, "$Co(Co(Co)_4)_2$" should read --$Co(Co(CO)_4)_2$--.

Column 4, line 4, "or" should read --of--.

$\mathfrak{Signed\ and\ Sealed\ this}$ twenty-fifth $\mathfrak{Day\ of}$ May 1976

[SEAL]

Attest:

RUTH C. MASON
*Attesting Officer*

C. MARSHALL DANN
*Commissioner of Patents and Trademarks*